Dec. 22, 1970 KARL-ULRICH STEIN 3,550,099

DATA-STORAGE APPARATUS

Filed Aug. 23, 1967

INVENTOR
Karl-Ulrich Stein

BY Schiller & Schiller
ATTYS.

United States Patent Office 3,550,099
Patented Dec. 22, 1970

3,550,099

DATA-STORAGE APPARATUS

Karl-Ulrich Stein, Munich, Germany, assignor to Siemens Aktiengesellschaft, Munich, Germany, a corporation of Germany Filed Aug. 23, 1967, Ser. No. 662,758
Claims priority, application Germany, Aug. 24, 1966, S 105,502
Int. Cl. G11c *11/02;* H01f *17/04*
U.S. Cl. 340—174 7 Claims

ABSTRACT OF THE DISCLOSURE

A data-storing apparatus with a plurality of storage elements particularly magnetizable elements which are in operative communication with electrical conductors constructed in the manner of printed circuits, and having broad-band transformers with ferromagnetic cores, in which the ferromagnetic cores of the broad-band transformers are constructed as block-shaped ferrite bodies and provided with elongated passages, each pair of sensing lines passing through a passageway in such a ferrite body, in which the body may be of tubular form or of rectangular shaped block-like formation and may be divided into parts to enable its cooperation with printed circuit conductors and the like.

THE DISCLOSURE

The invention relates to an apparatus for storing information employing a plurality of storage elements, preferably, thin magnetic layers, magnetizable toroidal cores and the like as the storage elements. Such storage elements are placed in the corresponding storage conditions by means of current impulses on electrical lines and the storage information is taken therefrom over electrical lines, so-called sensing lines being provided therefor. The electrical lines are not of filamentary or wire construction, but are printed on, or etched on or out on carrier plates, along the lines of printed circuits or similarly coated circuit paths.

It is well known in the art to couple each two sensing lines, i.e. a pair of sensing lines to a sense amplifier over a broad-band transformer. As a result of this arrangement, identical spurious or interference signals occuring on both sensing lines of a pair of sensing lines, which are produced by control of the storage elements, are balanced out, while the desired sensing signals are transmitted. Prior devices of this type employ transformers consisting of ferrite toroidal cores and windings which are disposed around the core legs of such ferrite toroidal cores. Such ferrite toroidal cores have a diameter of at least several millimeters and are provided with several windings, whose wire ends are contacted with the corresponding sensing lines as well as with a common grounding connection and the input of the sense amplifier. This type of spurious signal suppression, however, is relatively costly due to the use of wound toroidal core transformers.

The problem underlying the invention is to eliminate these disadvantages in a simple manner, in a data storage apparatus employing output transformers in the sensing lines of a type especially advantageous for use with printed circuits.

The invention resides in an arrangement in which the ferromagnetic cores of the broad-band transformers are not constructed as toroidal cores with coil windings, but as tubular or rectangular shaped, block-like ferrite bodies provided with passageways or cores therein, with each pair of sensing lines being guided through a ferrite body passageway. Consequently, the ferrite body forms a so-called ferrite sheating for each pair of sensing lines so that these lines perform the same function as prior ferrite toroidal core transformers with respect to the spurious signal compensation but without possessing the disadvantage of the costly core structure. The broad use of ferrite sheatings for line wires and line paths are already known as such for suppressing purposes.

If the ferrite bodies are constructed in tubular form it is then merely necessary to guide each pair of grounding and signal-carrying conductors, which together represent the line for a sensing signal, through such tube without requiring a manual or mechanical winding operation, which as is well known, entails great difficulties, particularly as a result of the small dimensions of such structural components. If, according to the other construction of the invention, rectangular or similar-shaped block-like ferrite bodies are employed for the broad-band transformers which are provided with passageways, the use of a uniform ferrite body for several pairs of sensing lines represents a further substantial advance in the art.

It is particularly advantageous to construct the ferrite bodies in two parts so that tape-like conductors, or of the printed type can be conducted through the passageways, this being accomplished by dividing the ferrite body along the line or plane of the passageways through which such lines are to extend. Thus, it is particularly expedient to simultaneously employ one of the two ferrite body parts as a supporting body for the sensing lines, and to extend such supporting body beyond the storage structure at the ends thereof and to cover the respective pairs of sensing lines extending therefrom with another ferrite body so that the magnetic flux is capable of closing around each pair of sensing lines from such strip-like ferrite block over the ferrite supporting body. Consequently, the production of such data-storage installations, as in the production of true matrix stores, can be fully automatically effected along the principles of printed circuit technology. In addition, the dimensions of the equipment according to the invention can be kept within suitable limits so that not only can the production cost be reduced but also the space requirements of this type of storage equipment. The carrier plate of ferrite can then be disposed adjacent to the actual store block, if the paths of the sensing lines are disposed in the line assembly thereabove. In a matrix with thin magnetizable layers, the carrier plate then operates as a keeper which favorably affects the qualities of the store. If, however, the ferrite material of the carrier plates does not extend as far as the store center of the store block, then, in addition to the conductors and their contact points, and if necessary, the individual lines of terminating supposing impedances are expediently arranged thereabove.

In the drawings, which represent the practical examples of the invention:

Figures 1, 2:
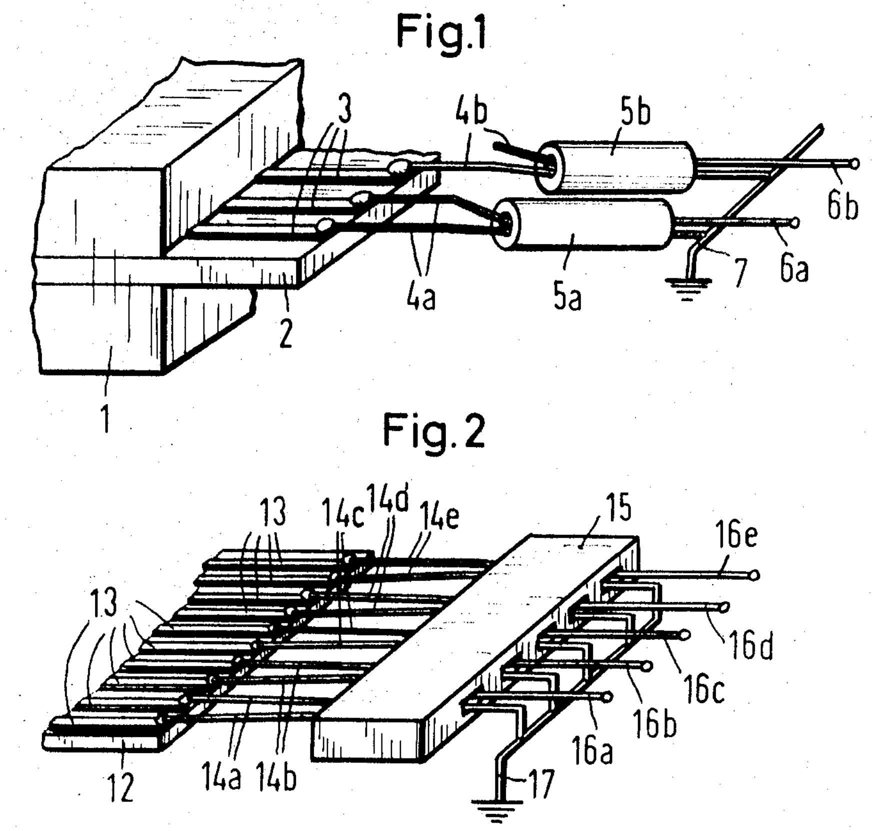
FIG. 1 is a perspective view of a portion of a data-storage structure, illustrating the use of tubular ferrite bodies.
FIG. 2 is a similar view, illustrating the use of a rectangular-shaped block-like ferrite body having a plurality of passageways therein.

FIG. 1 schematically illustrates a portion of a data-storage arrangement according to the invention in which the magnetizable elements (not illustrated) are located within a store block 1. Supporting member 2 extends beyond one front end of the store block 1 so that the sensing lines 3 located on the supporting body can be contacted with wire sensing line conductors. Adjacent sensing lines 3 are combined into respectively pairs of sensing lines 4*a*, 4*b*, with each pair of sensing lines being conducted through a ferrite tube 5*a*, 5*b*. In each case one conductor of a pair of sensing lines is connected with a common connecting line 7 and suitably contacted, for example, grounded. In each case, the other line *6a, 6b,* of a pair of sensing lines is available for connection with the sense amplifier. Thus, there is achieved not only the provision of the ferrite tubes 5*a*, 5*b* serving to compensate the spurious signals induced on the lines of each pair of sensing lines, but also the windings of toroidal core transformers of the previous known type is in this exceedingly simple manner rendered unnecessary so that the production cost, which is very substantial due to the great number of individual transformers required can be greatly reduced.

In the construction of FIG. 2 a carrier plate 12 is associated with the store block, on which plate sensing lines are disposed along the lines of printed circuit technology. These sensing lines are contacted by filamentary or wire electrical conductors, with the adjacent sensing lines in each case being combined into respective pairs of sensing lines 14*a*, 14*b* . . . 14*e*. Each pair of sensing lines runs through a passageway in the block-shaped ferrite body 15, and in each case, one end of each conductor of a pair of sensing lines 16*a*, 16*b* . . . 16*e*, is contacted with a common ground connection 17, with the other line of each pair of sensing lines being available for connection to the sense amplifier. The use of a single ferrite block 15 for several pairs of sensing lines not only reduces the space requirements but also the production cost in comparison with the apparatus illustrated in FIG. 1 in which a separate ferrite tube is employed for each pair of sensing lines.

Figure 3:
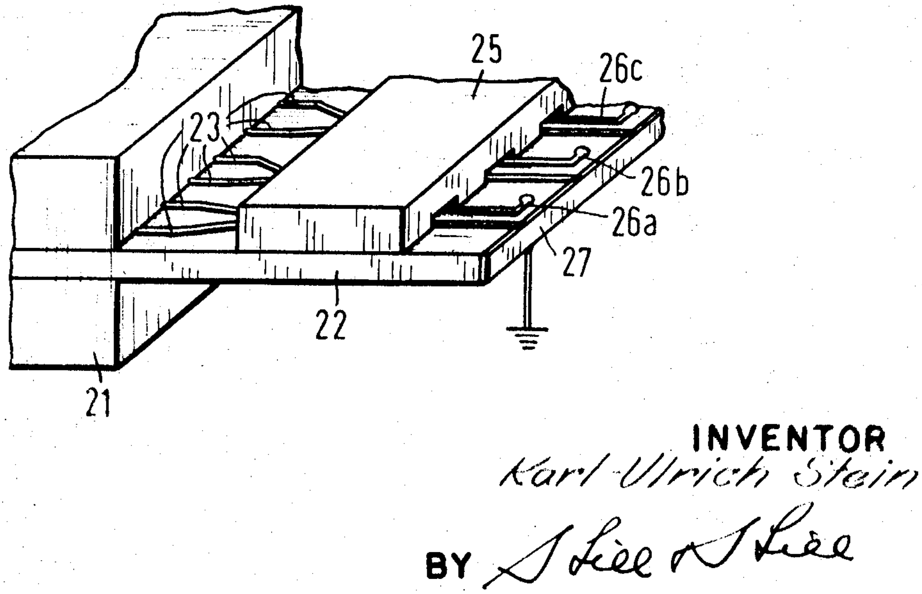
FIG. 3 is a similar view illustrating the use of a two-piece construction of the ferrite body.

In the construction of FIG. 3 the supporting body 22 of store block 21 is extended beyond the adjacent end of the store block, with the supporting body consisting of ferromagnetic material. Sensing lines 23, constructed along the lines of printed circuit technology are mounted on the supporting body and combined into pairs of sensing lines adjacent the ferrite block strip 25. The passageways, in the form of recesses in ferrite block strip 25, are so arranged with respect to the pairs of sensing lines that between the pairs of sensing lines the magnetic flux is capable, in the operating condition, of closing from ferrite block strip 25 to ferrite supporting body 22. One sensing line conductor of each pair of sensing lines extends to the front end of the ferrite supporting body 22 and there connected with edge contact layer 27 so that this contact layer is available as a common grounding conductor. The other conductors 26*a*, 26*b*, 26*c* of each pair of sensing lines is not extended to the extreme end of ferrite carrier plate 22 but terminate at contact points on the top side of ferrite carrier plate 22 spaced from such and, to which connections to the corresponding sense amplifiers can be attached.

Changes may be made within the scope and spirit of the appended claims which define what is believed to be new and desired to have protected by Letters Patent.

I claim:

1. A data-storing apparatus with a plurality of storage elements particularly magnetizable elements arranged for suppression of spurious signals and which are in operative communication with electrical conductors constructed in the manner of printed circuits, and broad-band transformers having ferromagnetic cores in which the ferromagnetic cores of the broad-band transformers are constructed as a block-shaped ferrite body having a plurality of elongates passages therein, each pair of sensing lines making a single passing through a respective passageway in such ferrite body.

2. A data-storing apparatus according to claim 1, wherein the ferrite body is in the form of a rectangular-shaped block-like body.

3. A data-storing apparatus according to claim 1, wherein the ferrite body is formed by two parts.

4. A data-storing apparatus according to claim 3, wherein a ferrite body, serving as a carrier plate for effecting operative connection of the ends of the sensing lines, which ends likewise are constructed along the lines of printed or thin-film circuits, as well as for other structural elements there required, forms one of said parts and another ferrite block provided with recesses is assembled on the carrier plate and forms the other of said parts.

5. A data-storing apparatus according to claim 4, wherein the common grounding connection for a conductor of each pair of sensing' lines is constructed as an edge contact layer on the ferrite carrier plate.

6. A data-storing apparatus according to claim 4, wherein the ferrite carrier plate also serves as carrier plate for the sensing and, if present, modulation lines within the storage structure.

7. A data-storing apparatus according to claim 6, wherein the ferrite carrier plate within the storage structure serves as a magnetic keeper for the open magnetic flux of magnetizable store layers.

References Cited

UNITED STATES PATENTS

| | | | |
|---|---|---|---|
| 2,776,411 | 1/1957 | Anderson | 333—29 |
| 2,825,892 | 3/1958 | Duinker | 340—174 |
| 3,325,791 | 6/1967 | Italia | 340—174 |
| 3,397,394 | 8/1968 | Maeda | 340—174 |
| 3,402,401 | 9/1968 | Taren | 340—174 |
| 3,484,761 | 12/1969 | Howells. | |

FOREIGN PATENTS

| | | | |
|---|---|---|---|
| 851,814 | 10/1960 | Great Britain | 336—221 |

JAMES W. MOFFITT, Primary Examiner

U.S. Cl. X.R.

336—175, 212